United States Patent
Heilig et al.

(10) Patent No.: US 6,338,501 B1
(45) Date of Patent: Jan. 15, 2002

(54) PROTECTIVE OCCUPANT KNEE RESTRAINT DEVICE IN A VEHICLE

(75) Inventors: Alexander Heilig, Wissgoldingen; Dirk Schultz; Gerd Zischka, both of Schwäbisch Gmünd; Werner Freisler, Königsbronn; Bernd Kleinmann, Schwäbisch Gmünd, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/553,521

(22) Filed: Apr. 20, 2000

(30) Foreign Application Priority Data

Apr. 22, 1999 (DE) .................... 299 07 163 U
Sep. 1, 1999 (DE) .................... 299 15 365 U

(51) Int. Cl.⁷ ............................. B60R 21/04
(52) U.S. Cl. ........................... 280/753
(58) Field of Search .............. 280/728.1, 728.3, 280/730.1, 732, 752, 753, 731, 728.2, 733, 743.1

(56) References Cited

U.S. PATENT DOCUMENTS

| | | | | |
|---|---|---|---|---|
| 3,806,154 A | * | 4/1974 | Akiyama | 280/753 |
| 4,417,750 A | * | 11/1983 | Burry | 280/753 |
| 4,951,963 A | * | 8/1990 | Behr et al. | 280/753 |
| 5,458,366 A | * | 10/1995 | Hock et al. | 280/729 |
| 5,536,043 A | | 7/1996 | Lang et al. | |
| 5,775,729 A | * | 7/1998 | Schneider et al. | 280/730.1 |
| 5,816,613 A | * | 10/1998 | Specht et al. | 280/753 |
| 6,032,978 A | * | 3/2000 | Spencer et al. | 280/730.1 |
| 6,131,950 A | * | 10/2000 | Schroter | 280/753 |
| 6,142,522 A | * | 11/2000 | Bossenmaier et al. | 280/752 |
| 6,170,871 B1 | * | 1/2001 | Goestenkors et al. | 280/743.1 |
| 6,283,508 B1 | * | 9/2001 | Nouwynck et al. | 280/753 |

FOREIGN PATENT DOCUMENTS

| | | |
|---|---|---|
| DE | 19730397 | 1/1998 |
| JP | 06032195 | 8/1994 |

* cited by examiner

Primary Examiner—Brian L. Johnson
Assistant Examiner—Gerald Klebe
(74) Attorney, Agent, or Firm—Tarolli, Sundheim, Covell, Tummino & Szabo L.L.P.

(57) ABSTRACT

The invention relates to a knee restraint device for the knee protection of occupants in motor vehicles, comprising a load distribution plate for direct contact with the knees of the occupant. The knee restraint device further comprises a drive device which in a cage of restraint moves the load distribution plate from a starting position toward the knees up to a restraint position. A retracting device is provided which moves the load distribution plate from the restraint position back toward the starting position.

17 Claims, 5 Drawing Sheets

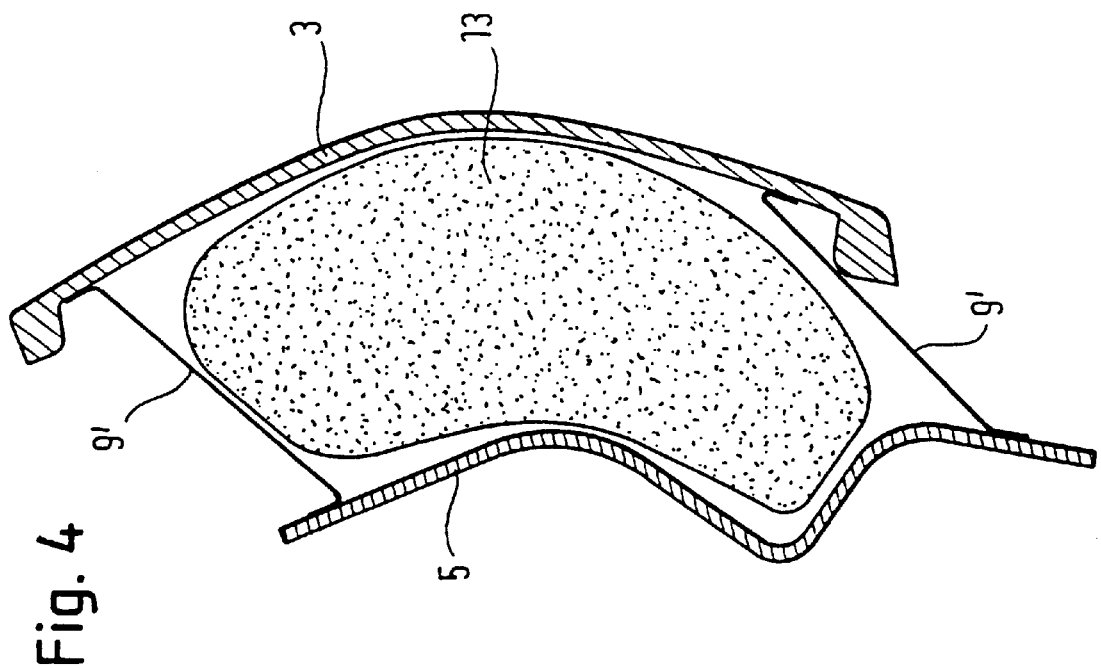
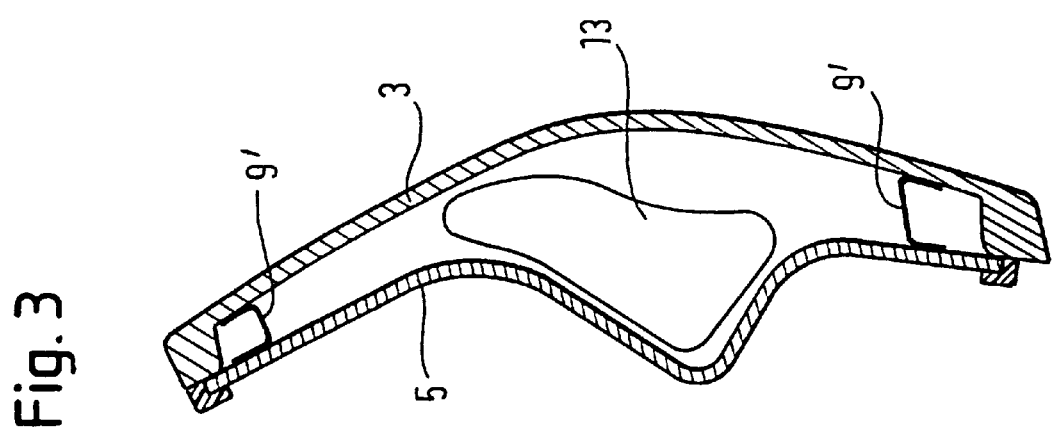

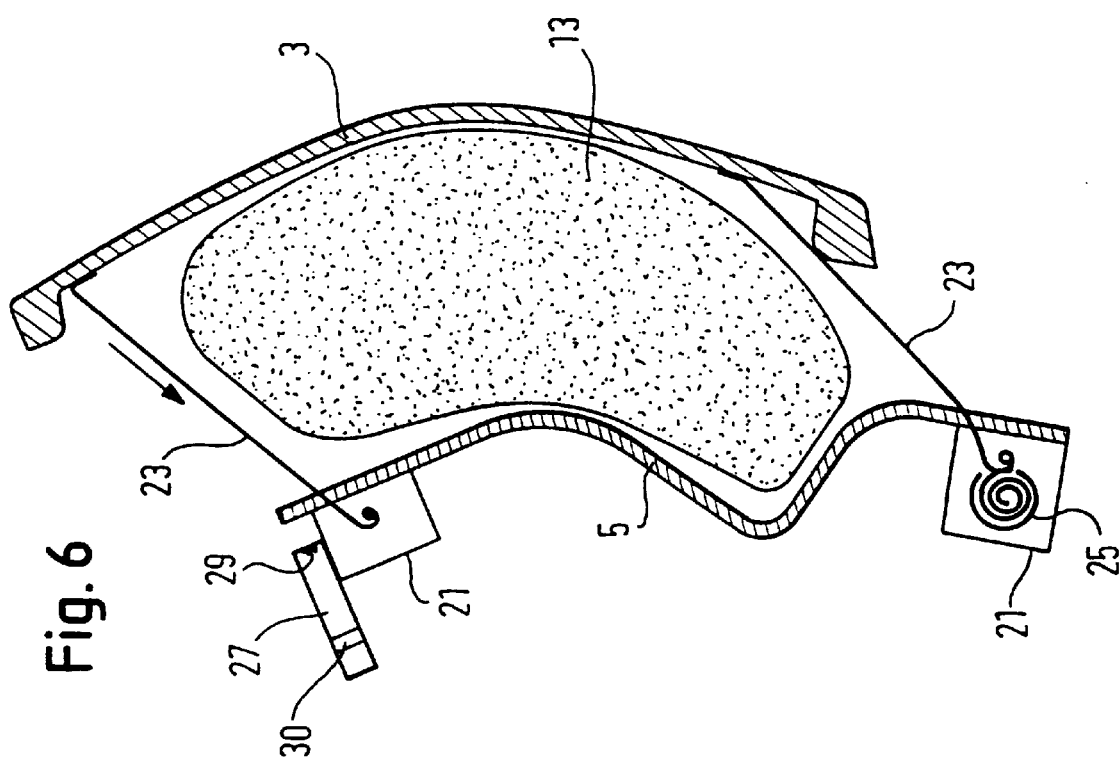
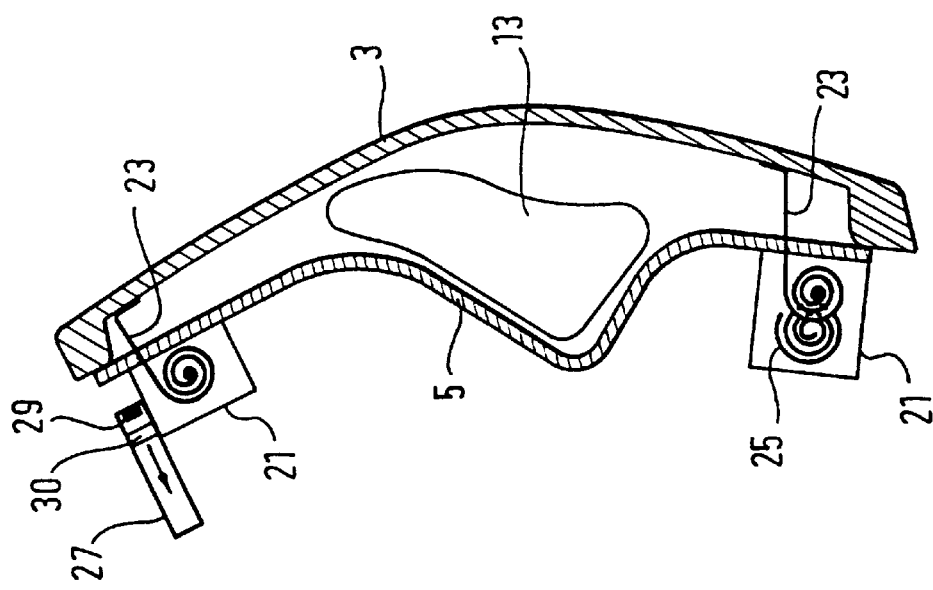

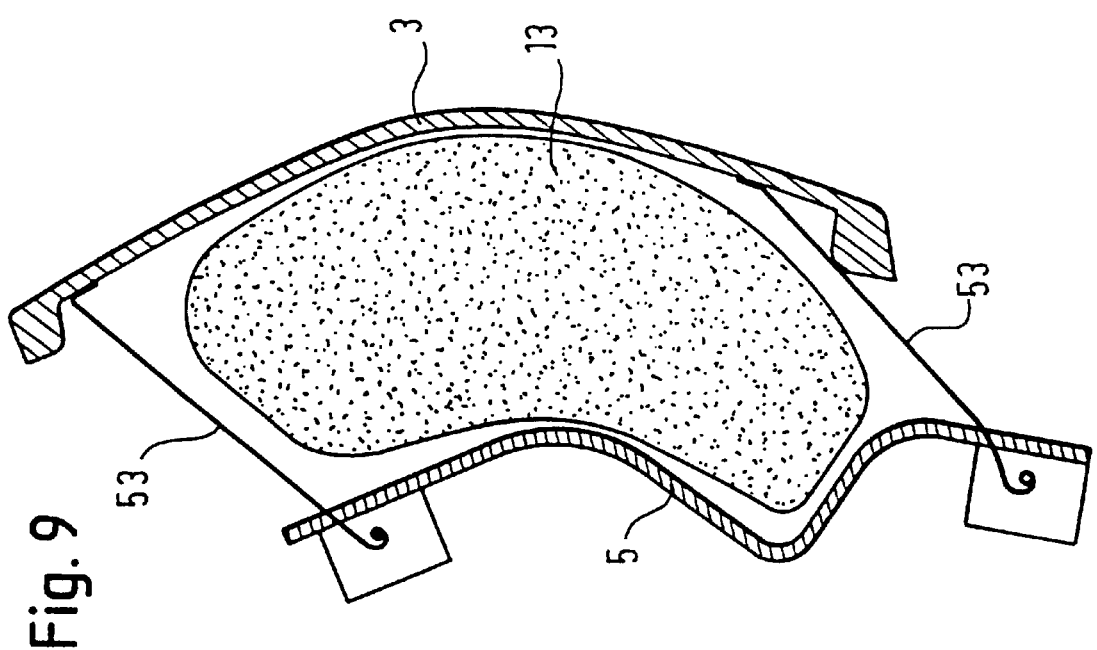
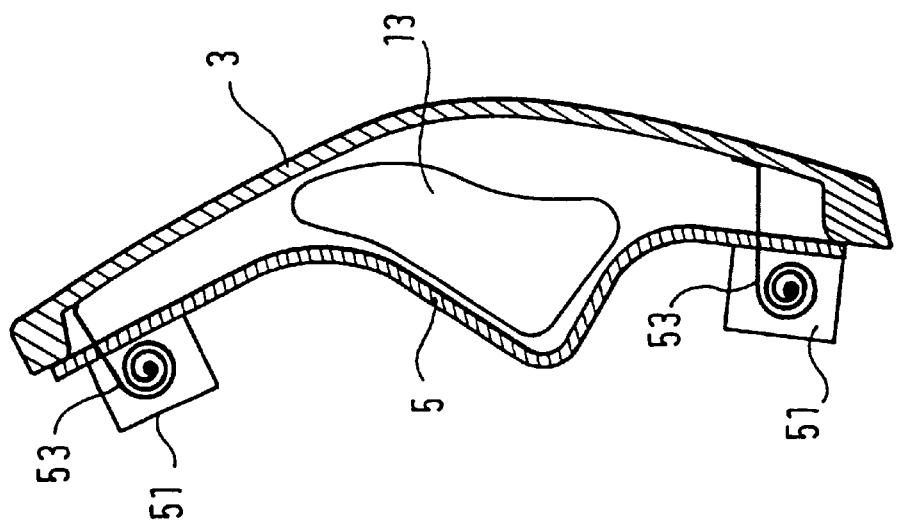

PROTECTIVE OCCUPANT KNEE RESTRAINT DEVICE IN A VEHICLE

TECHNICAL FIELD

This invention relates to a knee restraint device for the knee protection of occupants in motor vehicles.

BACKGROUND OF THE INVENTION

So-called active knee restraint devices have been conceived to stabilize the sitting position of the occupant in the case of restraint and largely prevent a movement of the lower extremities. The load distribution plate is moved toward the knees of the occupant by means of a gas bag which constitutes the drive means and is disposed between load distribution plate and dashboard. The restraint position is defined by means of tethers, which connect the load distribution plate with the dashboard. The tethers may also be arranged such that they are involved in controlling the direction of movement of the load distribution plate.

In the case of a secondary impact or when leaving the vehicle after an accident, the load distribution plate protruding into the foot well may lead to a danger or be in the way.

BRIEF SUMMARY OF THE INVENTION

The knee restraint device in accordance with the invention eliminates the disadvantages mentioned above. This is achieved in a knee restraint device which comprises a load distribution plate for direct contact with the knees of the occupant. The knee restraint device further comprises a drive means which in a case of restraint moves the load distribution plate from a starting position toward the knees up to a restraint position. A retracting means is provided which moves the load distribution plate from the restraint position back toward the starting position. The retracting means can pull the load distribution plate completely back into the starting position toward the dashboard or bring it close to the starting position. By means of this retraction of the load distribution plate the danger for the occupants in the case of a secondary impact is reduced. Even after the possible deflation of the gas bag, the load distribution plate has a defined position and makes it easier for the occupant to step out or be rescued.

The retracting means is at least one elastically resilient member, e.g. a spring or an elastic plastic strap or an elastic tube. Preferably, several of these elastic members are provided, namely in particular at the edges or corners of the load distribution plate.

Moreover, the retracting means may also have an energy source, e.g. a compressed gas source or a spring under tension. By means of the energy source, the retraction can be effected even faster and above all in a predeterminable way.

BRIEF DESCRIPTION OF THE DRAWINGS

FIG. 3 shows a second embodiment of the knee restraint device according to the invention with the load distribution plate in the starting position, FIG. 4 shows the embodiment in accordance with FIG. 3 with the load distribution plate in the restraint position, FIG. 5 shows a third embodiment of the knee restraint device according to the invention with the load distribution plate in the starting position, FIG. 6 shows the embodiment in accordance with FIG. 5 with the load distribution plate in the restraint position, FIG. 8 shows a modified embodiment of a knee restraint device in accordance with the invention with the load distribution plate in the starting position, and FIG. 9 shows the knee restraint device shown in FIG. 8 with the load distribution plate in the restraint position.

DETAILED DESCRIPTION OF THE PREFERRED EMBODIMENTS

Figure 2:
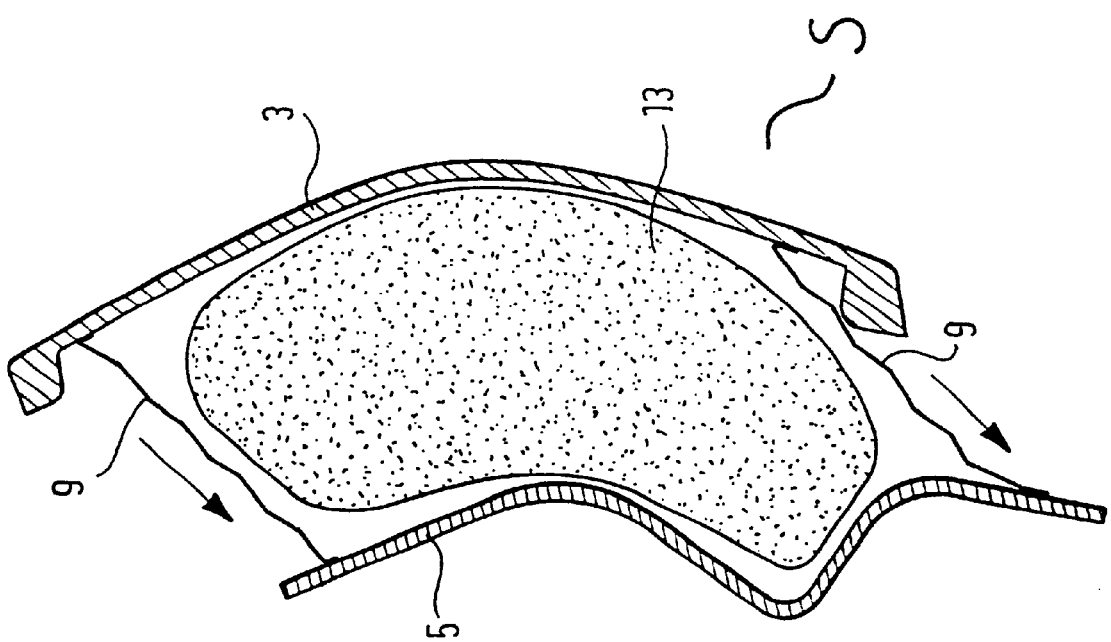
FIG. 2 shows the embodiment in accordance with FIG. 1 with the load distribution plate in the restraint position.

In all embodiments parts corresponding to each other are provided with the same reference numerals, so that with respect to detailed explanations concerning subsequent embodiments reference may be made to the more detailed explanations in connection with the previous embodiments.

Figure 1:
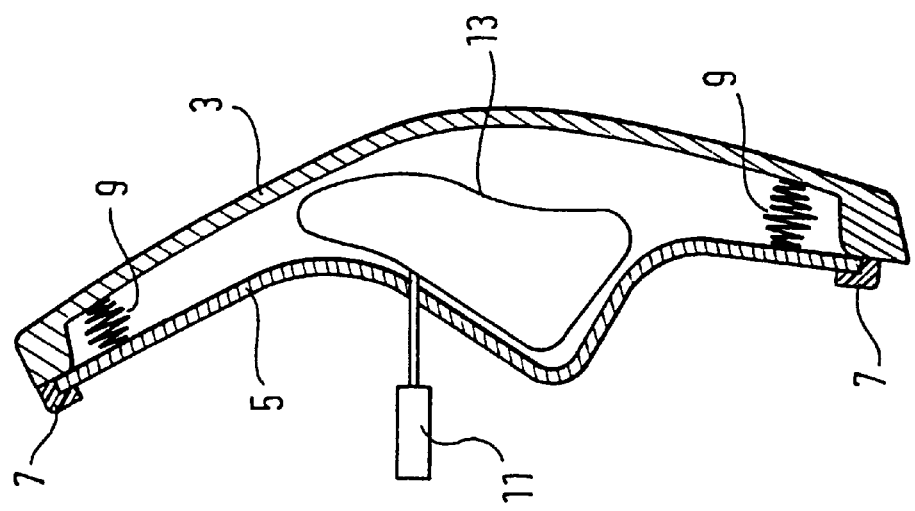
FIG. 1 shows a cross-sectional view of a first embodiment of the knee restraint device with the load distribution plate in the starting position.

FIG. 1 represents a knee restraint device for vehicle occupants in a section in longitudinal direction of the vehicle and in the condition installed in the vehicle. The vehicle interior space is designated by "S" in FIG. 2. The knee restraint device has a load distribution plate 3, which may include plastic foam elements, deformation plates or sections, and which in the case of restraint has a direct contact with the knees of the occupant. Reference numeral 5 designates the dashboard of the vehicle, to which the load distribution plate 3 is fixed. The term dashboard should be understood such that it includes both the dashboard itself and supporting elements attached to the dashboard, e.g., holding plates or the like. The holding plate or holding plates may also be part of a gas bag module fastened to the dashboard. In the starting position shown in FIG. 1, the load distribution plate 3 is fixed to the dashboard 5, e.g. by elastic load connections 7, where any other releasable attachment may be used as well. Moreover, at the corners of the load distribution plate having a substantially elongated tetragonal shape four retracting means in the form of springs 9 are mounted. Each spring has two ends, one end being fixed to the load distribution plate 3 and the other one being fixed to the dashboard 5. Between the load distribution plate 3 and the dashboard 5 there is also provided a drive means in the form of a gas bag 13 to be inflated via a gas generator 11.

In the case of restraint, the gas generator 11, which is only shown in FIG. 1, but is present in all embodiments, is activated and the gas bag 13 is inflated. As a result, the load distribution plate 3 is torn out of its anchorage and moved toward the knees of the occupant into the maximum position shown in FIG. 2, also referred to as restraint position. The spring. 9 also serve as tethers and limit the travel of the load distribution plate 3. In addition, they define the direction of movement of the load distribution plate into the restraint position shown in FIG. 2. In the position shown in FIG. 2, the load distribution plate is close to the knees of the occupant, so that the knees of the occupant moving forward during an accident strike against the load distribution plate after a short travel, which load distribution plate largely prevents a further movement of the knees and thus of the entire lower extremities (thighs and pelvic area).

The gas bag collapses after the restraint. The springs 9 pull the load distribution plate 3 back toward the starting position or even into the starting position itself, by again urging the load distribution plate 3 against the dashboard 5. Having served as a restraint, the load distribution plate 3 thus has a defined position in the vehicle, which is away from the knees, so that it no longer represents a risk in the case of a secondary impact and is not in the way either when the occupant is stepping out or is being rescued.

The embodiment shown in FIGS. 3 and 4 substantially corresponds to the one explained above, with the exception that instead of the springs 9 several elastic plastic straps 9' are provided as retracting means, which are mounted on the one hand at the load distribution plate 3 and on the other hand at the dashboard 5. The elastic plastic straps 9' are also provided at the corners of the load distribution plate 3 and on the one hand serve as tethers, which define the restraint position shown in FIG. 4. On the other hand, they also serve for retracting the load distribution plate 3 after the restraint toward the starting position, which is represented in FIG. 3. The plastic straps may also be made of a composite material, e.g. from several plastic materials of different elasticity. Moreover, e.g. portions or threads may be integrated in the plastic straps, which portions or threads have a high load-bearing capacity, but a low elasticity, so that they define the restraint position, and the elastic portions or elastic threads then serve to retract the load distribution plate 3. In addition, separate tethers and separate springs or elastic plastic straps may of course also be provided.

In the embodiment represented in FIGS. 5 and 6, several winding-up retractors for flexible, but hardly elastic straps 23 are provided, which straps are fixed at the corners of the load distribution plate 3. The retractors 21 are disposed behind the dashboard 5 and mounted at the same. They may act like a vehicle seat belt retractor and limit the movement of the load distribution plate 3 in the case of restraint, i.e. define the restraint position and subsequently retract the load distribution plate 3 toward the starting position. To ensure that this retraction is effected quickly, each retractor 21 has an associated energy source, e.g. a spring 25 under tension, such as a helical spring, or a compressed gas source 27 which is designed like a belt tensioner and contains a pyrotechnic charge which drives a piston 31 coupled to a retractor shaft, onto which the strap 23 is rolled up.

Figure 7:
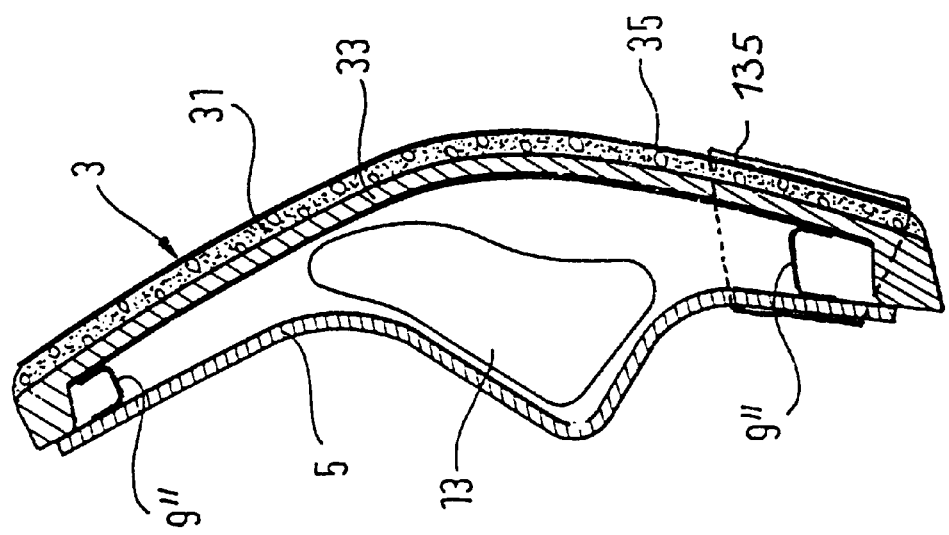
FIG. 7 shows a fourth embodiment of the knee restraint device according to the invention with the load distribution plate in the starting position.

The embodiment represented in FIG. 7 substantially corresponds to the one represented in FIG. 3. In this embodiment, the load distribution plate 3 consists of several sandwiched plates 31, 33 disposed one behind the other. The plate 31 may for instance be particularly elastic and have a high damping, whereas the plate 33, so to speak, serves for attachment or stabilization. To fix the plates 31, 33 at each other, they are surrounded by an elastic plastic tube 35, which is slipped over both plates 31, 33. The plastic tube 35 has projections 9", which are disposed like the elastic plastic straps 9' of FIGS. 3 and 4 and act like the same and are fixed to the dashboard 5. Alternatively, several separate plastic tubes may be provided, which serve as retracting means. The elastic plastic straps may either be fixed at the rear of the load distribution plate 3, enclose the same at the front or be embedded in the same.

In accordance with a further embodiment section-wise illustrated in FIG. 7 at the lower end of the restraint device, the load distribution plate may have a foamed outer surface which is covered towards the vehicle interior space by means of a foil. The foil 135 replaces the plastic tube 35, is connected with the dashboard and serves as a retracting means by it being stretched elastically—optionally also plastically in sections—on unfolding of the gas bag. The foil 135 may also be back-molded or back-pressed with a plastic material symbolized by the intermediate plate 31 in the Figure, or it may be glued on a plastic material, the plastic material preferably forming an elastic intermediate layer. The plastic straps 9" may be omitted in this embodiment.

The embodiment represented in FIGS. 8 and 9 differs from those described above in that no retracting means is provided. Rather, holding and damping devices 51 are disposed at the corners of the load distribution plate 3. The same consist of one rolled-up metal strap 53 each, which is fixed to the load distribution plate 3. Upon moving the load distribution plate 3 into the restraint position shown in FIG. 4, the load distribution plate 3 remains in this position, even if the gas bag 13 already collapses in part. The metal straps 53, which were unwound during the movement of the load distribution plate 3 into the restraint position, hold the load distribution plate 3 in the restraint position. In the case of a secondary impact, the metal straps 53 are deformed and serve as damping.

Instead of a metal strap there may also be provided a piston-cylinder damping means, so that the load distribution plate is held in the restraint position by the piston-cylinder damping means with linear guideways. In the case of a secondary impact, the piston rods may for instance deliberately undergo a plastic deformation and damp the impact.

What is claimed is:

1. A knee restraint device for the knee protection of occupants in motor vehicles, comprising:
    a load distribution plate for direct contact with said knees of said occupant,
    a drive means for moving, only in a case of restraint, said load distribution plate from a starting position toward said knees up to a restraint position, and
    a retracting means separated from said drive means,
    said retracting means, in the case of restraint, moving said load distribution plate subsequently from said restraint position back toward said starting position.

2. The knee restraint device as claimed in claim 1, wherein said vehicle includes a dashboard and wherein said drive means is a gas bag which is disposed between said load distribution plate and said dashboard.

3. The knee restraint device as claimed in claim 1, wherein said restraint device has at least one elastically resilient member.

4. The knee restraint device as claimed in claim 3, wherein said elastically resilient member is at least one of a spring, an elastic plastic strap and an elastic tube.

5. The knee restraint device as claimed in claim 3, wherein said elastically resilient member is a foil.

6. The knee restraint device as claimed in claim 5, wherein said vehicle includes a vehicle interior space and wherein said foil externally covers a side of said load distribution plate facing said vehicle interior space and is fastened to said dashboard.

7. The knee restraint device as claimed in claim 6, wherein a resilient intermediate layer is provided between said foil and said load distribution plate.

8. The knee restraint device as claimed in claim 1, wherein said retracting means has an energy source whose energy serves to retract said load distribution plate toward said starting position.

9. The knee restraint device as claimed in claim 8, wherein said energy source is at least one of a compressed gas source and a spring under tension.

10. The knee restraint device as claimed in claim 1, wherein said retracting means is designed such that it limits a travel of said load distribution plate toward said knees.

11. The knee restraint device as claimed in claim 1, wherein said retracting means has at least one winding-up retractor for retracting said load distribution plate.

12. The knee restraint device as claimed in claim 1, wherein said load distribution plate consists of several plates attached to each other, an elastic plastic tube being provided which holds said plates together and surrounds the same.

13. A knee restraint device for the knee protection of occupants in motor vehicles comprising:
- a load distribution plate for direct contact with said knees of said occupant,
- a drive means for, in a case of restraint, moving said load distribution plate from a starting position toward said knees up to a restraint position, and
- a retracting means for moving said load distribution plate from said restraint position back toward said starting position,
- said restraint device having at least one elastically resilient member, and
- said elastically resilient member being at least one of a spring, an elastic plastic strap and an elastic tube.

14. A knee restraint device for the knee protection of occupants in motor vehicles, comprising:
- a load distribution plate for direct contact with said knees of said occupant,
- a drive means for, in a case of restraint, moving said load distribution plate from a starting position toward said knees up to a restraint position, and
- a retracting means for moving said load distribution plate from said restraint position back toward said starting position,
- said restraint device having at least one elastically resilient member, and
- said elastically resilient member being a foil.

15. The knee restraint device according to claim 14, wherein said vehicle includes a vehicle interior space and wherein said foil externally covers a side of said load distribution plate facing said vehicle interior space and is fastened to said dashboard.

16. The knee restraint device according to claim 15, wherein a resilient intermediate layer is provided between said foil and said load distribution plate.

17. A knee restraint device for the knee protection of occupants in motor vehicles, comprising:
- a load distribution plate for direct contact with said knees of said occupant,
- a drive means for, in a case of restraint, moving said load distribution plate from a starting position toward said knees up to a restraint position, and
- a retracting means for moving said load distribution plate from said restraint position back toward said starting position,
- said retracting means having at least one winding-up retractor for retracting said load distribution plate.

* * * * *